Figure 1:
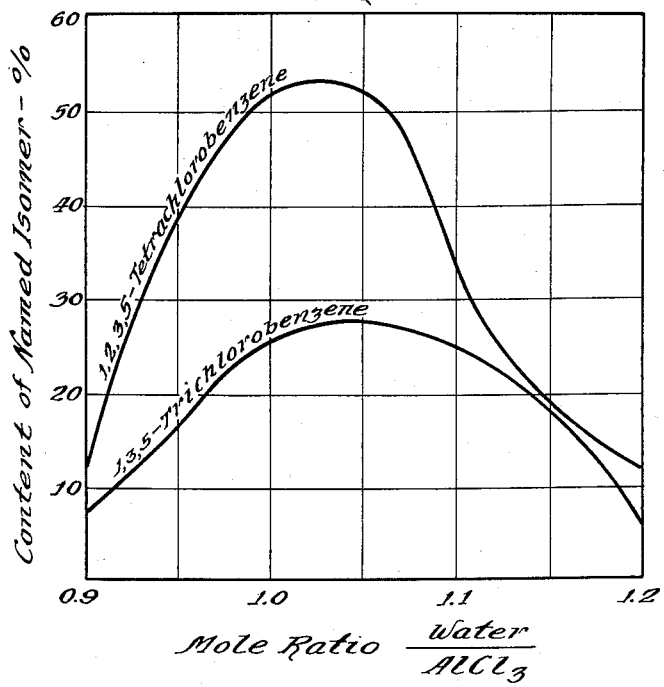

Inventor:
Douglas Woodruff
By: [signature]
Agent

United States Patent Office 2,866,829
Patented Dec. 30, 1958

2,866,829

ISOMERIZATION OF POLYCHLOROBENZENES

Douglas Woodruff, Marengo, Ill.

Application March 26, 1956, Serial No. 573,988

10 Claims. (Cl. 260—650)

This invention relates to the isomerization of polyhalobenzenes. More particularly, this invention relates to the isomerization of polychlorobenzenes containing three or four chlorine atoms to the molecule. In one specific aspect thereof, this invention relates to the isomerization of unsymmetrical and vicinal trichlorobenzenes to symmetrical trichlorobenzene. In another specific aspect thereof, this invention relates to the isomerization of vicinal and symmetrical tetrachlorobenzenes to unsymmetrical tetrachlorobenzene.

The production of hexachlorocyclohexane by the additive chlorination of benzene has become an important procedure in chemical industry due to the high insecticidal activity of the resulting product. This insecticidal activity is essentially due to but one stereoisomer (the gamma isomer) of the five stereoisomers present in the hexachlorocyclohexane, this gamma isomer being present in concentrations of only about 15% (12-16%) of the total hexachlorocyclohexane produced. To obtain an insecticidal concentrate it is common practice to separate the active gamma stereoisomer more or less completely from the four essentially non-insecticidal stereoisomers in the crude mixture. Such a separation results in the production of up to about 85% of essentially insecticidally inert stereoisomers which have little if any direct commercial utility. In order to convert this large quantity of byproduct stereoisomers into materials of greater commercial value it is common practice to subject them to a dehydrochlorination procedure whereby these materials are converted to a mixture of polychlorobenzenes, predominately 1,2,4- and 1,2,3-trichlorobenzenes. Conventionally, the byproduct stereoisomers are dehydrochlorinated by subjecting them to an elevated temperature (275-500° C.), usually in the presence of a catalyst such as ferric chloride or iron. Under such conditions a reaction product is obtained consisting of (neglecting materials present in small amounts) 70 to 80% 1,2,4-trichlorobenzene and 20 to 30% 1,2,3-trichlorobenzene. Only negligible amounts of the symmetrical 1,3,5-trichlorobenzene are formed. A complete analysis of a mixture resulting from such a dehydrochlorination procedure is presented in U. S. Patent 2,725,408 as follows:

|  | Percent |
|---|---|
| 1,2,4-trichlorobenzene | 68.4 |
| 1,2,3-trichlorobenzene | 24.7 |
| 1,2-dichlorobenzene | 1.0 |
| 1,3-dichlorobenzene | 1.5 |
| 1,4-dichlorobenzene | 0.6 |
| 1,2,4,5-tetrachlorobenzene | 1.8 |
| 1,2,3,4-tetrachlorobenzene | 0.7 |
| 1,2,3,5-tetrachlorobenzene | 0.6 |
| Pentachlorocyclohexene | (¹) |
| Total | 99.3 |

¹ Comprises essentially the remainder.

It will be noted that the above analysis does not even mention 1,3,5-trichlorobenzene and this material, if present, obviously does not account for more than a few tenths of a percent of the total mixture.

One object of this invention is to provide an improved process for the isomerization of polyhalobenzenes containing three or four halogen atoms to the molecule.

Another object of this invention is to provide an improved process for the isomerization of polychlorobenzenes containing three chlorine atoms to the molecule.

A further object of this invention is to provide an improved process for the isomerization of unsymmetrical trichlorobenzene to symmetrical trichlorobenzene.

An additional object of this invention is to provide an improved process for the isomerization of vicinal trichlorobenzene to symmetrical trichlorobenzene.

Yet another object of this invention is to provide an improved process for the isomerization of polychlorobenzenes containing four chlorine atoms to the molecule.

A further object of this invention is to provide an improved process for the isomerization of vicinal tetrachloro- to unsymmetrical tetrachlorobenzene.

An additional object of this invention is to provide an improved process for the isomerization of symmetrical tetrachlorobenzene to unsymmetrical tetrachlorobenzene.

Other objects of this invention will become apparent as the description thereof proceeds.

Figure 2:
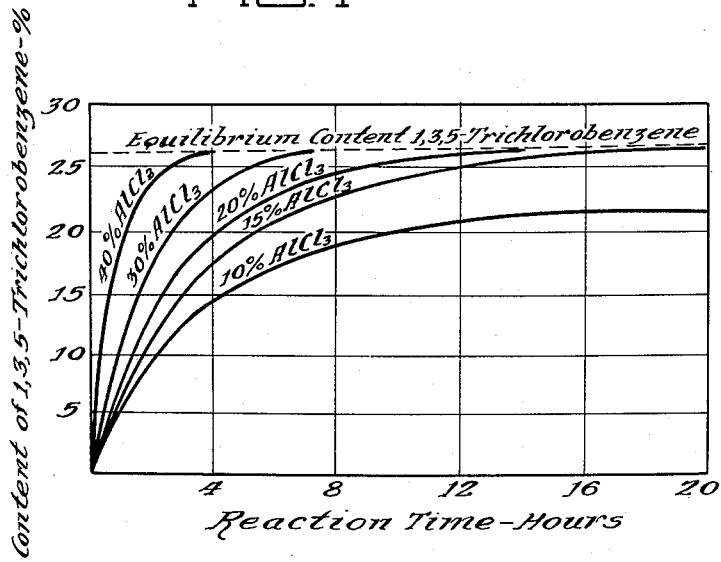

The nature and objects of this invention will be more clearly understood from the accompanying figures in which:

Figure 1 is a graphical representation of the effect of catalyst composition on the yield of certain isomerized products by the practice of this invention, and Figure 2 is a graphical representation of the effect of catalyst concentration on the rate of a typical isomerization reaction of this invention.

Broadly and briefly described, my invention embraces a process for the isomerization of polyhalobenzenes containing three or four halogen atoms to the molecule wherein one of these compounds or a mixture thereof is heated with a catalyst comprising a mixture of an anhydrous aluminum halide and a critically defined quantity of water.

It has long been known that anhydrous aluminum halides, exemplified by anhydrous aluminum chloride, are powerful catalysts and exhibit this catalytic activity in a large number of reactions of extremely diverse types. Very frequently, the catalytic activity of anhydrous aluminum halides is greatly enhanced by the presence of a promotor, a typical promoter being an anhydrous hydrogen halide, exemplified by anhydrous hydrogen chloride. In fact, in some instances at least, the presence of such a promoter is essential for bringing about an anhydrous aluminum halide catalyzed reaction. It is conventional practice to generate the promoter in situ by adding a small amount of water to the reaction mixture containing the reactant or reactants and the anhydrous aluminum halide. Less frequently, it has been found necessary to employ a rather considerable amount of water, based on the amount of anhydrous aluminum halide present, in order to secure the desired catalytic action.

I have discovered that the isomerization of polyhalobenzenes containing three to four halogen atoms to the molecule may be catalyzed by anhydrous aluminum halides plus a rather considerable amount of water but I have further discovered, as a new and unexpected result, that for maximum rate of isomerization the water to anhydrous aluminum halide ratio must be in a very narrow and critical range. If this ratio is even slightly below or even slightly above this narrow and critical range the amount of isomerization obtained within a practical reaction period is so small as to be of no commercial significance.

For the better understanding of this invention the following examples of specific embodiments thereof are given but it is to be understood that these examples are illustrative only and do not necessarily limit the scope of the invention to the specific details set forth therein.

*Example 1*

To 166 parts by weight commercial 1,2,4-trichlorobenzene (containing, in addition to 1,2,4-trichlorobenzene, about 21% of 1,2,3-trichlorobenzene) were added 30 parts by weight of anhydrous aluminum chloride which had been freshly pulverized and immediately added to the trichlorobenzene mixture under anhydrous conditions in a dry box. The resulting mixture was vigorously stirred and 4.05 parts by weight of water were added dropwise over a period of 1 to 5 minutes after which heat was applied to the reactor until the contents refluxed (208–212° C.), vigorous stirring being continued.

The reaction was continued under reflux temperature and with vigorous stirring until a sample of the reactor liquid showed a 1,3,5-trichlorobenzene content of about 25%; from 16 to 24 hours were required to reach this point in a number of check runs. When the reaction had proceeded to this extent, the reaction product was cooled and the solid was removed therefrom by filtration or centrifuging. Liquid reaction products retained by the cake were recovered either by washing the cake with benzene (for example) or by decomposing the cake with about 200 parts by weight of cold water, separating the organic layer resulting, washing this layer with about 200 parts by weight cold water, separating the wash water and adding the washed organic layer to the filtrate.

1,3,5-trichlorobenzene may be separated from the reaction product by distillation. If the filter cake was decomposed with water to recover liquid reaction products absorbed thereby, then the still charge is preferably dried prior to distillation. If, on the other hand, reaction products are recovered from the filter cake by washing the cake with benzene (for example) then a forerun cut is taken during distillation which contains the wash liquor employed.

1,3,5-trichlorobenzene boils at 208.4° C./760 mm. or 4.6° C. below the boiling point of 1,2,4-trichlorobenzene and some 10° C. below the boiling point of 1,2,3-trichlorobenzene (which is present in the reaction mixture only in negligible quantities). The desired symmetrical trichlorobenzene may be separated from the unsymmetrical isomer and any vicinal isomer that may be present by taking it overhead through an efficient fractionating column. After removing 1,3,5-trichlorobenzene by distillation, the resulting still bottoms were admixed with the required amount of fresh commercial 1,2,4-trichlorobenzene and the resulting mixture was isomerized as previously described.

It will be noted that in this example 15% by weight anhydrous aluminum chloride was used, based on the total weight of organic reactant, anhydrous aluminum chloride and water. Also, it will be noted that the mole ratio of water to aluminum chloride employed in this example is 1.00. (Here, and elsewhere herein, in the calculation of the water to anhydrous aluminum chloride ratio it is assumed that the formula of anhydrous aluminum chloride is $AlCl_3$.)

A large number of runs were made under the conditions set forth in this example with the production of product mixtures having a 1,3,5-trichlorobenzene content averaging 26–27%.

Analytical figures set forth in this example and elsewhere herein were determined by infra red absorption spectroscopy using the modified base line technique. Carbon bisulfide solutions of the samples were employed in the analyses and a matched pair of 0.050 mm. absorption cells was used.

1,2,4-trichlorobenzene and 1,3,5-trichlorobenzene have strong and well spaced absorption bands with peaks at frequencies of 1240 and 1060 reciprocal centimeters, respectively. Unfortunately, an absorption band of vicinal trichlorobenzene interferes with both these bands so that mixtures containing all three isomers cannot be analyzed through absorption measurements in this region of the spectrum. Accordingly, in this work, the following absoption bands were used:

| Isomer: | Frequency, cm.$^{-1}$ |
| --- | --- |
| 1,2,4-trichlorobenzene | 670 |
| 1,3,5-trichlorobenzene | 658 |
| 1,2,3-trichlorobenzene | 685 |

At head of these bands the absorption of the isomer corresponding thereto is strong while that of the remaining two isomers is weak. Due to the close spacing of these bands the instrument was run at a slow speed with a minimum slit width to obtain maximum resolution.

*Example 2*

A number of runs were made identical to the run of Example 1 in all respects with the exception that the effect of slight variations in the water to anhydrous aluminum chloride ratio was investigated. In accordance with Example 1, the weight percent of anhydrous aluminum chloride employed in the various runs of the present example averaged 15% by weight based on the total weight of organic reactant, anhydrous aluminum chloride and water, this average figure being subject to minor but inconsequential variations from run to run due to the small differences in the amount of water included in the respective mixtures set forth below. The results set forth in the following table include, in addition to the runs of the present example, data from Example 1 also in order to give a more complete picture.

| Run | Wt. Percent Water on $AlCl_3$ | Mole Ratio $H_2O:AlCl_3$ | Percent 1,3,5-Trichlorobenzene in the Reaction Product |
| --- | --- | --- | --- |
| 2A | 12.85 | 0.90 | 7–8 |
| 2B | 12.85 | 0.95 | 15.16 |
| 1 | 13.5 | 1.00 | 26–27 |
| 2C | 15.0 | 1.10 | 24–25 |
| 2D | 16.3 | 1.20 | 6–7 |

The extremely critical nature of the water to anhydrous aluminum chloride ratio is evident from the data presented in the above table. If the mole ratio of water to anhydrous aluminum chloride is in the very narrow range 1.00 to 1.10, the symmetrical trichlorobenzene content of the reaction product is at a maximum (24–27%). Commercially practical results are obtained with ratios as low as 0.95 and as high as 1.15, the symmetrical trichlorobenzene content of reaction products obtained at these ratios being about 17%. However, if this ratio is as low as 0.90 or as high as 1.20, the 1,3,5-trichlorobenzene content of the resulting reaction mixtures is 70 to 75% less than the 1,3,5-trichlorobenzene content of reaction mixtures obtained when operating within the narrow range of ratios of 1.00 to 1.10 and such low conversions are not of commercial interest. The data of the above table are shown graphically in Figure 1 hereof.

*Example 3*

As mentioned previously, the commercial 1,2,4-trichlorobenzene employed in Examples 1 and 2 contained about 21% of the vicinal isomer. In the present example, pure 1,2,3-trichlorobenzene was isomerized under the conditions set forth in Example 1. The isomerized product contained 25% 1,3,5-trichlorobenzene. It is interesting to note that isomerization of 1,2,3-trichlorobenzene under the conditions here employed results in practically complete conversion of the charge to other isomers. The portion of the charge that is not converted to the symmetrical isomer is largely converted to the unsymmetrical isomer.

Example 4

This example describes the results obtained in a number of runs in which commercial 1,2,4-trichlorobenzene was isomerized with a water-anhydrous aluminum chloride catalyst having a mole ratio of 1.0. Five runs were made in which the weight percent anhydrous aluminum chloride present, based on the total weight of organic charge, anhydrous aluminum chloride and water was, respectively, 10%, 15%, 20%, 30% and 40%. All runs were conducted at reflux temperature. During the course of each of these runs, samples of the liquid portion of the reaction mixture were taken from time to time and analyzed for their content of symmetrical trichlorobenzene as previously described. The data obtained are shown graphically in Figure 2 hereof. As this figure shows, the rate of reaction increases as the weight percent anhydrous aluminum chloride in the reaction mixture increases. Thus, when this percentage is 40%, the liquid reaction product reaches a 1,3,5-trichlorobenzene content of 26.5% in about 4 hours; with 30% anhydrous aluminum chloride present the time required is about 7 hours; 20%, 14 hours; 15%, 20 hours, while when the content of anhydrous aluminum chloride is only 10%, the liquid reaction mixture contains only about 22% of the symmetrical isomer after 20 hours. Obviously, this behavior is not characteristic of a true catalytic reaction but is quite characteristic of many reactions in which aluminum chloride is used as a "catalyst."

Example 5

To 166 parts by weight commercial 1,2,4-trichlorobenzene were added 25 parts by weight of anhydrous aluminum chloride which had been freshly pulverized and immediately added to the polychlorobenzene mixture under anhydrous conditions in a dry box. The resulting mixture was vigorously stirred and 9.05 parts by weight aluminum chloride hexahydrate ($AlCl_3 \cdot 6H_2O$) were added thereto following which the reaction mixture was vigorously stirred and brought to reflux temperature, the run then continuing as described in Example 1. The final liquid reaction product contained 25% symmetrical trichlorobenzene.

The 9.05 parts by weight aluminum chloride hexahydrate of this example is equivalent to 4.05 parts by weight water and 5.00 parts by weight anhydrous aluminum chloride. Accordingly, the ratios of the reactants employed in this example are exactly the same as the corresponding ratios of Example 1. Aluminum chloride hexahydrate provides a convenient means for accurately introducing the extremely critical water requirements into the reaction mixture.

Example 6

From data previously presented herein it would appear that the isomerization reaction of this invention, when carried to completion, results in an equilibrium mixture of isomers. To establish this point more definitely, samples of commercial 1,2,4-trichlorobenzene were mixed with sufficient symmetrical trichlorobenzene to give mixtures containing 25% and 30% of the 1,3,5-isomer. These mixtures were separately isomerized under conditions described in Example 1. In both instances reaction products containing about 26.5% of the symmetrical isomer were obtained and continuing the reaction for an extended period beyond the point at which this concentration was observed resulted in no further change in the content of the symmetrical isomer.

A number of additional experiments (one of which is set forth in Example 3) have demonstrated that regardless of the configuration of the isomer employed as charge, a reaction product of essentially constant composition is approached as a limit, this equilibrium mixture containing about 26–27% symmetrical trichlorobenzene with the remainder consisting mostly of 1,2,4-trichlorobenzene. The equilibrium mixture contains only small amounts of the vicinal isomer.

Example 7

Commercial vicinal tetrachlorobenzene was isomerized with various water-anhydrous aluminum chloride mixtures, generally in accordance with the technique outlined in Examples 1 and 2. The tetrachlorobenzene charge contained 79.2% 1,2,3,4-tetrachlorobenzene, 14.7% 1,2,4,5-tetrachlorobenzene and 4.33% 1,2,3,5-tetrachlorobenzene. The weight percent anhydrous aluminum chloride employed in the various runs set forth in this example averaged 15%, based on the total weight of organic reactant, anhydrous aluminum chloride and water, this average figure being subject to minor and inconsequential variations from run to run due to small differences in the amount of water included in the respective reaction mixtures described below. The reactions described in this example were run at the reflux temperature of the respective reaction mixtures (230–245° C.) for a period of approximately 18 hours. At the conclusion of an experiment, the solids were separated from the reaction mixture and the liquid portion was water washed, dried and analyzed by infra red spectroscopy.

The data obtained in five experiments run in accordance with the procedure outlined above and using various water to anhydrous aluminum chloride ratios are set forth in the following table:

| Run No. | Wt. Percent Water on $AlCl_3$ | Mole Ratio $H_2O:AlCl_3$ | Analysis of Liquid Products in Percent | | |
|---|---|---|---|---|---|
| | | | Vicinal | Symmetrical | Unsymmetrical |
| 7A | 12.2 | 0.90 | 67.0 | 12.9 | 12.9 |
| 7B | 13.5 | 1.00 | 23.5 | 18.3 | 52.0 |
| 7C | 14.25 | 1.05 | 20.2 | 19.7 | 52.5 |
| 7D | 15.0 | 1.10 | 57.2 | 11.3 | 32.0 |
| 7E | 16.3 | 1.20 | 73.0 | 13.4 | 8.0 |

The change in the 1,2,3,5-tetrachlorobenzene content of the liquid reaction products with variations in the water to anhydrous aluminum chloride ratio is plotted in Figure 1.

Again, the highly critical nature of the water to anhydrous aluminum chloride ratio is evident. The conversion of the technical vicinal tetrachlorobenzene (79.2% content of vicinal isomer) to unsymmetrical tetrachlorobenzene, under the conditions of time and temperature used in these experiments, is maximum within a very narrow range of water-anhydrous aluminum chloride ratios and falls off precipitously if this ratio is even slightly lower or even slightly higher than the narrow optimum ratio range. When the water to anhydrous aluminum chloride ratio is within the range 0.95 to 1.10 the unsymmetrical tetrachlorobenzene content of the liquid reaction product varies from 32 to 52.5% (having a maximum value of about 52% in the ratio range 1.00 to 1.05), against 4.33% unsymmetrical tetrachlorobenzene content of the charge. If the water to aluminum chloride ratio is reduced from 0.95 to 0.90 the unsymmetrical tetrachlorobenzene content of the liquid reaction products drops 68% and if this ratio is increased from 1.10 to 1.20 the unsymmetrical tetrachlorobenzene content of the liquid reaction products drops 75%. The water to anhydrous aluminum chloride ratio is somewhat more critical in the isomerization of tetrachlorobenzenes than when trichlorobenzenes are processed. With trichlorobenzenes and under the reaction conditions with respect to time and temperature set forth in Examples 1 and 2, the liquid reaction product contains the equilibrium amount of symmetrical trichlorobenzene when this ratio is in the range 1.0 to 1.1 but with tetrachlorobenzenes the maximum content of unsymmetrical trichlorobenzene is obtained (after 18 hours at reflux temperature) with a ratio in the range 1.0 to 1.05. There is an easily observable but not too serious drop in the unsymmetrical tetrachlorobenzene content of the liquid product on increasing this ratio from 1.05 to 1.1. With a water to anhydrous aluminum chloride ratio of 1.1 somewhat more than 18 hours at reflux temperature is required to reach the equilibrium concentration of tetrachlorobenzene isomers.

Additional experiments with tetrachlorobenzenes have shown that the weight percent anhydrous aluminum chloride present, based on the total weight of organic reactant, anhydrous aluminum chloride and water, on the speed with which the equilibrium reaction product is obtained generally follows the findings with respect to trichlorobenzenes as described in Example 2 and shown graphically in Figure 2 hereof. Also, additional experiments have shown that under the optimum operating conditions set forth herein, identical mixtures are obtained at equilibrium regardless of the nature of the tetrachlorobenzene charged. This equilibrium reaction mixture contains (on a 100% tetrachlorobenzenes basis) about 55% unsymmetrical, 25% vicinal and 20% symmetrical tetrachlorobenzene.

While this invention has been described in connection with the isomerization of polychlorobenzenes containing three or four chlorine atoms to the molecule with water-anhydrous aluminum chloride mixtures it is not limited thereto. Polybromobenzenes containing three or four bromine atoms to the molecule may be isomerized similarly and the aluminum chloride component of the catalyst may be replaced with aluminum bromide. However, since such polybromobenzenes are not commercial products and since aluminum bromide is an expensive chemical, these substitutions are of relatively small commercial significance and/or are not economically feasible.

Also, while the specific examples of this invention describe reactions conducted at the atmospheric pressure reflux temperature of the various reaction mixtures employed, the invention is not limited to the use of such temperatures. The crux of this invention resides in the discovery of the highly critical nature of the water to anhydrous aluminum chloride ratio of the catalyst on the activity thereof and the use of catalysts in the isomerization reactions having ratios within the narrow and critical range required for maximum activity. When employing catalysts falling in this narrow and critical range, such reaction variables as time, temperature and catalyst concentration are more or less interchangeable in accordance with principles well understood by those skilled in the art. For example, as Figure 2 shows, with catalyst composition and reaction temperature constant, the time for attaining equilibrium isomerization increases from 4 hours to 20 hours as the aluminum chloride content of the reaction mixture decreases from 40% to 15% by weight. As will be evident to those skilled in the art, the time required for obtaining the equilibrium reaction mixture using 40% by weight anhydrous aluminum chloride may be increased at will by decreasing the reaction temperature, that is by using a reaction temperature below the atmospheric pressure refluxing temperature of the mixture. Similarly, the time required for obtaining the equilibrium reaction mixture using 15% by weight anhydrous aluminum chloride may be decreased to a greater or lesser extent by conducting the reaction at temperatures above the atmospheric pressure reflux temperature of the reaction mixture, for example, at temperatures corresponding to refluxing conditions under pressures greater than atmospheric. The choice of a particular combination of time, temperature and catalyst concentration should obviously be based on an evaluation of many factors relating to economics and practicability and each individual combination of such factors will result in a unique choice. For example, batch reactions conducted at the atmospheric pressure reflux temperature of the reaction mixture proceed to equilibrium in a reasonable time when a reasonable concentration of anhydrous aluminum chloride is present but a continuous process for the isomerization of these polychlorobenzenes would dictate the use of reaction temperatures above the atmospheric pressure reflux temperature of the reaction mixture and the use of a rather considerable concentration of anhydrous aluminum chloride.

Be it remembered, that while this invention has been described in connection with specific details and specific embodiments thereof, these details and embodiments are illustrative only and are not to be considered limitations on the spirit or scope of said invention except in so far as these may be incorporated in the appended claims.

I claim:

1. A process for the isomerization of polychlorobenzenes of the group consisting of trichlorobenzenes and tetrachlorobenzenes, comprising heating said polychlorobenzenes with a catalyst produced by the interaction of water and anhydrous aluminum chloride, the $H_2O/AlCl_3$ mole ratio of said catalyst being in the approximate range 0.95 to 1.10.

2. A process for the isomerization of polychlorobenzenes of the group consisting of trichlorobenzenes and tetrachlorobenzenes, comprising heating said polychlorobenzenes with a catalyst produced by the interaction of anhydrous aluminum chloride and aluminum chloride hexahydrate, the $H_2O/AlCl_3$ mole ratio of said catalyst being in the approximate range 0.95 to 1.10.

3. A process for the conversion of a material selected from the group consisting of unsymmetrical trichlorobenzene, vicinal trichlorobenzene and mixtures of these trichlorobenzene isomers to symmetrical trichlorobenzene, comprising heating said material with a catalyst produced by the interaction of water and anhydrous aluminum chloride, the $H_2O/AlCl_3$ mole ratio of said catalyst being in the approximate range 0.95 to 1.10.

4. The process of claim 3, further characterized by the fact that the water required for the production of the catalyst is supplied in the form of aluminum chloride hexahydrate.

5. A process for the conversion of a material selected from the group consisting of unsymmetrical trichlorobenzene, vicinal trichlorobenzene and mixtures of these trichlorobenzene isomers to symmetrical trichlorobenzene, comprising heating said material at approximately the atmospheric pressure boiling point thereof for from four to twenty hours with a catalyst produced by the interaction of water and anhydrous aluminum chloride, the $H_2O/AlCl_3$ mole ratio of said catalyst being in the approximate range 0.95 to 1.10 and the $AlCl_3$ content of the reaction mixture being in the range 10% to 40% by weight.

6. The process of claim 5, further characterized by the fact that the water required for the production of the catalyst is supplied in the form of aluminum chloride hexahydrate.

7. A process for the conversion of a material selected from the group consisting of vicinal tetrachlorobenzene, symmetrical tetrachlorobenzene and mixtures of these tetrachlorobenzene isomers to unsymmetrical tetrachlorobenzene, comprising heating said material with a catalyst produced by the interaction of water and anhydrous aluminum chloride, the $H_2O/AlCl_3$ mole ratio of said catalyst being in the approximate range 0.95 to 1.10.

8. The process of claim 7, further characterized by the fact that the water required for the production of the catalyst is supplied by aluminum chloride hexahydrate.

9. A process for the conversion of a material selected from the group consisting of vicinal tetrachlorobenzene, symmetrical tetrachlorobenzene and mixtures of these tetrachlorobenzene isomers to unsymmetrical tetrachlorobenzene, comprising heating said material at approximately the atmospheric pressure boiling point thereof for from four to twenty hours with a catalyst produced by the interaction of water and anhydrous aluminum chloride, the $H_2O/AlCl_3$ mole ratio of said catalyst being in the approximate range 0.95 to 1.10 and the $AlCl_3$ content of the reaction mixture being in the range 10 to 40% by weight.

10. The process of claim 9, further characterized by the fact that the water required for the production of the catalyst is supplied in the form of aluminum chloride hexahydrate.

References Cited in the file of this patent

UNITED STATES PATENTS 2,666,085  Fitzpatrick _____ Jan. 12, 1954